(12) United States Patent
Goldberg et al.

(10) Patent No.: US 7,460,469 B2
(45) Date of Patent: Dec. 2, 2008

(54) FAST REROUTING OF TRAFFIC IN A CIRCUIT SWITCHED MESH NETWORK

(75) Inventors: Noam Goldberg, Tel-Aviv (IL); Eitan Yehuda, Zoran (IL)

(73) Assignee: ECI Telecom Ltd., Petach Tikva (IL)

( * ) Notice: Subject to any disclaimer, the term of this patent is extended or adjusted under 35 U.S.C. 154(b) by 487 days.

(21) Appl. No.: 11/031,010

(22) Filed: Jan. 10, 2005

(65) Prior Publication Data

US 2005/0185643 A1 Aug. 25, 2005

(30) Foreign Application Priority Data

Jan. 21, 2004 (IL) ...................... 159979

(51) Int. Cl.
*G01R 31/08* (2006.01)
(52) U.S. Cl. .................. 370/218; 370/352; 370/355; 370/357
(58) Field of Classification Search ................ 370/389, 370/217, 218, 355, 356, 357
See application file for complete search history.

(56) References Cited

U.S. PATENT DOCUMENTS

| 4,956,835 | A | | 9/1990 | Grover et al. | |
|---|---|---|---|---|---|
| 5,550,805 | A | | 8/1996 | Takatori et al. | |
| 6,094,682 | A | * | 7/2000 | Nagasawa | 709/224 |
| 6,246,668 | B1 | * | 6/2001 | Kusyk | 370/228 |
| 6,377,543 | B1 | * | 4/2002 | Grover et al. | 370/227 |
| 2002/0194339 | A1 | | 12/2002 | Lin et al. | |
| 2003/0123493 | A1 | * | 7/2003 | Takahashi | 370/539 |
| 2004/0190444 | A1 | * | 9/2004 | Trudel et al. | 370/224 |

FOREIGN PATENT DOCUMENTS

| CN | 1265258 | 8/2000 |
|---|---|---|
| EP | 1134922 | 9/2001 |
| EP | 1463370 | 9/2004 |

OTHER PUBLICATIONS

M. Jaeger et al., "Evaluation of Novel Resilience Schemes in Dynamic Optical Transport Network", article, 2003, Germany.
P.A. Veitch et al., "A Distributed Protocol for Fast and Robust Virtual Path Restoration", article, 1995, pp. 21/1-21/10, IEE Savory Place, London, UK.

(Continued)

*Primary Examiner*—Seema S. Rao
*Assistant Examiner*—Sai-Ming Chan
(74) *Attorney, Agent, or Firm*—Browdy and Neimark

(57) ABSTRACT

Technology for rerouting a data stream in a communication circuit switched mesh network comprising one or more cross-connecting nodes, the data stream comprises a plurality of data frames each associated with at least one overhead byte, and the rerouting is performed by using a path identifier while switching the data stream at one or more cross-connecting nodes; the path identifier is carried by at least one overhead byte associated with at least one of the data frames.

19 Claims, 3 Drawing Sheets

OTHER PUBLICATIONS

Papadimitriou, D. et al—"Analysis of Generalized MPLS-Based Recovery Mechanisms (Including Protection and Restoration) Internet Draft, Internet Engineering Task Force (IETF)"; IETF, Nov. 2002, p. 6, paragraph 1.

Assi, C. et al—On the Merit of IP/MPLS Protection/Restoration in IP Over WDM Networks; Globecom 01. 2001 IEEE Global Telecommunications Conference, Nov. 2001; IEEE, vol. 1 of 6.

Awduche et al; "Multiprotocol Lambda Switching: Combining MPLS Traffic Engineering Control With Optical Crossconnects"; IEEE Communications Magazine, IEEE Service Center, vol. 39, No. 3, Mar. 2001.

Lang, Jonathan P., et al., "Generalized MPLS Recovery Functional Specification draft-ietf-ccamp-gmple-recovery-functional-00.txt", CCAMP Working Group, Internet Draft: http://www3.ietf.org/proceedings/03jul/I-D/draft-ietf-ccamp-gmpls, Jan. 2003, pp. 1-16.

* cited by examiner

| INGRESS LOGICAL PORT | PATH IDENTIFIER | PRIORITY | FAULT | EGRESS LOGICAL PORT | |
|---|---|---|---|---|---|
| | | | | ALLOWED | GRANTED |
| a | X | | | k | k |
| b | * | | | k | — |
| ⋮ | ⋮ | ⋮ | ⋮ | ⋮ | ⋮ |
| c | * | | | $\ell$ | $\ell$ |
| ⋮ | ⋮ | ⋮ | ⋮ | ⋮ | ⋮ |
| d | y | 5 | | n | n |
| e | z | 4 | | n | n v — |
| f | * | 2 | | n | — |
| ⋮ | ⋮ | ⋮ | ⋮ | ⋮ | ⋮ |
| g | Q | | AIS v RDI | m | m |
| g | Q | * | | p | |

FIG.2

| INGRESS LOGICAL PORT | PATH IDENTIFIER | PRIORITY | | EGRESS LOGICAL PORT | |
|---|---|---|---|---|---|
| | | | | ALLOWED | GRANTED |
| a | X | 5 | | k,ℓ | ℓ |
| b | * | 3 | | K | k |
| c | * | 0 | | ℓ | — |
| ⋮ | ⋮ | ⋮ | ⋮ | ⋮ | ⋮ |
| d | y | 5 | | n,t | n v t |
| e | z | 4 | | n,t | n v t |
| f | * | 2 | | n | n v — |
| s | * | 0 | | t | t v — |

FIG.3

FAST REROUTING OF TRAFFIC IN A CIRCUIT SWITCHED MESH NETWORK

FIELD OF THE INVENTION

The present invention relates to switching of data streams in telecommunication networks, namely—in circuit switched mesh networks such as SONET and SDH as types of a TDM systems, and Optical Transport Networks (OTN) as a type of a WDM system.

BACKGROUND OF THE INVENTION

P. A. Veitch et al in the article "A distributed protocol for fast and robust virtual path restoration", 1995, The Institution of Electrical Engineers; printed and published by the IEE, Savoy place, London WC2R 0BL, UK, describe (in section 2.2) a principle of organizing standard internal tables of cross-connecting devices for providing a so-called protection virtual path switching in a network. In the case of pre-assigned path restoration, the standard internal table associates a particular input port with a particular output port, wherein each of them is reserved either for a specific working path or for a specific protection path of a single data stream.

Currently optical transport networks are (semi-)permanent in the sense that provisioning of connections is done on a long term basis. Most often, services are protected in the SONET/SDH layer with static protection mechanisms. Up to now, IP networks purely rely on slow but failure robust IP rerouting mechanisms. These will be enhanced in future by MPLS (Multi Protocol Label Switching) restoration functions. Optical transport networks (OTN) today are mostly based on static WDM (wavelength de-multiplexing) system connections. However, with the introduction of fast reconfigurable optical switching nodes like Optical Add Drop Multiplexers (OADMs) and Optical Cross Connects (OXCs), the optical layer may dynamically provide optical channel services and virtual topologies to higher layers. So-called control planes are defined in specific standardization documents and forums (for example, http://www.oiforum.com). A control plane, contrary to a data plane, mainly consists of distributed routing and signaling functions needed for connection control. With the availability of a control plane for the optical layer, MPLS-like restoration mechanisms based on optical channels can be introduced in OTNs. The Generalized Multiprotocol Label Switching (GMPLS) framework extends the Multiprotocol Label Switching (MPLS) concept for other layers than the IP layer, such as TDM layer or the optical layer. The creation and routing of Label Switched Paths (LSPs) can be done statically by the network management or dynamically through routing and signaling protocols. It is possible to port the control plane principle of MPLS, with modifications, to other layers like the optical layer. (For example, M. Jaeger et al, "Evaluation of Novel Resilience Schemes in Dynamic Optical Transport Networks"—work within the TransiNet project, supported by the Federal German Ministry of Education and Research, 2003).

It should be noted, however, that restoration techniques based on the use of the above-mentioned signaling protocols are complex and, the associated recovery time is often too long in comparison with optical transport network requirements, especially for services such as voice.

To the best of the Applicant's knowledge, there are no prior art solutions which would enable quick switching (reconfiguring) in mesh networks supporting SDH/SONET traffic in cases where shared protection paths are utilized without relying on the invocation of distributed routing and signaling as described in the above.

SUMMARY OF THE INVENTION

It is therefore an object of the present invention to provide a technique for fast reconfiguring a path of a data stream in a communication circuit-switched mesh network, for example transport networks such as SDH/SONET or OTN.

The above object can be achieved by a method for rerouting a data stream formed from successively transmitted data frames associated with one or more overhead bytes, in a communication circuit switched mesh network comprising one or more cross-connecting nodes, wherein the rerouting is performed through indications in the data plane of the network, namely by utilizing a path identifier in switching the data stream at said one or more cross-connecting nodes; said path identifier being carried in said one or more overhead bytes of the data stream.

The mentioned mesh networks are preferably optical networks, such as SDH/SONET or OTN.

The term "rerouting" covers any reconfiguring of a path, path segment or cross-connects (internal coupling segment between ports of a cross-connecting node) of the data streams, including the reconfiguring for data protection purposes.

For fully understanding the method, it should be explained that provisioning of working and protection paths and segments thereof in the network is performed in advance (i.e., pre-provisioned) by Network Management System (NMS) or any other control planning/management means. To be more specific, the pre-provisioning can be made not only to create end-to end backup paths, but also link and node segment bypasses for each working path. This pre-provisioning may be considered a preliminary step to the proposed method.

It should be emphasized, that the proposed method is much faster and simpler than the previously known ones owing to the fact it is performed by the data plane of the network, contrary to those methods based on using the control plane (i.e., contrary to utilizing various out-of-band protocols), and also owing to the fact that all alternative (protection) path segments and cross-connects are readily available as they are pre-provisioned by a centralized management system or distributed control plane, so that in the event of failure an immediate switch to an alternate path segment can be made without having to compute that path.

For reconfiguring the path inside a particular cross-connecting node, the method comprises reserving a specific logical input port for a data stream with a predetermined path identifier (i.e. that intended for rerouting), and reserving one or more logical output ports for outputting said data stream from one of them. Usually, if there is a pool of reserved output logical ports, the outputting is performed via the logical output port vacant at the time. However, priorities can be applied to the data stream to be rerouted and to any of the data streams (active or idle) outgoing the assigned logical output ports. The internal switching in the cross-connecting node can be then performed based on such priorities, regardless the number of the reserved output logical ports in the pool. The logical port carrying an idle data stream can be assigned the lowest priority and therefore be considered vacant.

The term "logical input (output) port" of the cross-connecting node should be understood as a combination of two parameters, wherein the first parameter is a particular physical input (output) port of the node and the second parameter is a specific time slot (for TDM systems) or a specific wavelength (for WDM systems) occupied by the data stream at the particular physical port.

For any of the above-mentioned types of networks, there is a path identifier, defined according to the suitable standard. In SONET/SDH networks, it is called a path trace identifier and actually identifies a source of the data stream. According to the suitable standards, and depending on whether the data stream is of high or low order, the path identifier can be carried by different overhead bytes (J1, J2, J0) of a SONET/SDH frame.

Actually, the path identifier may capture a number of bytes, not obligatory one, e.g., any proprietary used overhead that would uniquely identify a path or a source of such a path.

J1 (J2) byte in SONET/SDH is selected owing to the fact that, according to the accepted SDH/SONET standards, it is basically intended for indicating paths by a so-called "path trace identifier". The path trace identifier is a fixed-length binary string (of 64 or 16 bytes length) repetitively transmitted from the source node of a data stream using byte J1 (J2); the string is checked at the destination node for ensuring the proper connection.

It should be emphasized, however, that the path identifier was never used before for performing cross-connections, rerouting, protection switching, etc.

The method actually comprises another preliminary step, i.e., a step of providing one or more cross-connecting nodes respectively sensitive to (capable of distinguishing) one or more predetermined values of the path identifier. This step preferably comprises providing a modified internal switching means to the cross-connecting node, where a particular predetermined value of the path identifier is preferably associated with a specific logical input port where the particular data stream can be expected.

Accordingly, there is also proposed a method for performing a shared protection of a path or path section of a data stream in the mesh network, the method comprising:

reserving, at a particular cross-connecting node, a first logical input port for inputting a first incoming data stream carrying a first path identifier, reserving, at the same particular cross-connecting node, a second logical input port for transmitting a second incoming data stream carrying a second path identifier, reserving, at said particular cross-connecting node, one or more logical output ports as a shared pool of output logical ports for outputting from said pool at least one of said first and second incoming data streams, whenever required.

If only one shared output logical port is assigned (in other words, the pool comprises only one output logical port), in case of arriving one or both of said first and second incoming data streams at the respective first and second logical input ports of said cross-connecting node, only one of them will be switched to said shared logical output port.

Naturally, if there are fewer output logical ports in the pool than the arriving data streams, only some of the data streams will be switched to the output logical ports.

As has been mentioned already, the method may further comprise an additional operation of applying predetermined priorities to different incoming or outgoing data streams. In the above example, when two or more incoming data streams simultaneously pretend to one and the same output logical port belonging to the shared protection path, priorities of the incoming data streams could be applied. This operation would therefore comprise checking priorities of the competitive data streams and selecting the data stream with the higher priority for switching to the protection path.

If the pool comprises more than one logical output ports, the priorities may also be useful for selecting vacant or even currently busy output logical port(s) for one or more data streams to be rerouted. In this case, any outgoing data streams currently associated with output logical ports of the pool should also have their priorities. Usually, idle traffic has the lowest priority, and preemptive traffic has the second lowest priority.

In the proposed method, upon rerouting the data stream in the cross-connecting node, the path identifier will, as usually, be checked at the destination point of the protection path.

The method thereby ensures switching, at the cross-connecting node, at least two said incoming data streams to a shared protection path (path segment) associated with the reserved first output logical port. It should be emphasized, that fast dynamic reconfiguring of paths in the mesh network becomes possible without participation of a control/management plane, just by utilizing the path identifiers of the data streams, modifying the internal switching means (hardware/software) of the cross-connecting node, and by the required pre-provisioning (for example by an NMS) to share the protection bandwidth and configure the shared outgoing ports at each cross-connecting node.

The process of reconfiguring a data path (or a segment thereof) usually starts from detecting a fault in a working path of the data stream by receiving one or more indications at a specific network node from downstream network nodes i.e., backward defect indication (e.g., SONET/SDH RDI) or forward defect indication (e.g., SDH/SONET AIS) from an inverse path. The method may therefore comprise, at a specific cross-connecting node where an indication has been received on a fault in the working path of an incoming data stream, a step of switching said incoming data stream to an output logical port pre-provisioned for a protection path of said data stream. The output logical port may be a shared output logical port.

According to a second aspect of the invention, there is provided a cross-connecting switch for operating in a node of a communication circuit switched mesh network supporting data streams of successively transmitted data frames comprising overhead bytes, the switch being capable of performing internal rerouting of one or more incoming data streams by utilizing path identifiers being carried in the overhead bytes of the respective incoming data streams.

The switch has a first plurality of input logical ports and a second plurality of output logical ports. According to one embodiment, the switch is capable of rerouting a particular incoming data stream arriving at a specific input logical port, to one logical output port selected from a pool including one or more said output logical ports.

According to another embodiment, the switch is adapted to reroute two or more said incoming data streams with different path identifiers respectively arriving at two or more specific input logical ports of the switch, to one shared pool of output logical ports, said pool including one or more said output logical ports.

In practice, the pool may include logical output ports of one and the same physical output port of said switch. Preferably, all logical ports of the physical port are members of the pool.

However, the pool may comprise only one output logical port. In this case, the switch is capable of rerouting at least two said incoming data streams respectively arriving at two or more specific input logical ports of said switch to one shared output logical port at a time.

In a specific embodiment, the cross-connecting switch comprises a modified internal switching means for establishing dynamic internal connections there-inside, said means being operative to:

assign said pool of output logical ports to one or more said incoming data streams, identify each of said one or more incoming data streams based on the path identifiers transmitted by the at least one overhead byte associated with said data frames, switch the one or more said incoming data streams to respective vacant output logical ports of said pool.

In case there are no vacant output logical ports, the switching means should allow preempting one or more lower priority traffic streams using said pool.

Preferably, the internal switching means allow storing priorities assigned to different data streams, possibly including at least some of the data streams having predetermined said path identifiers.

Further preferably, the internal switching means allows storing priorities assigned to data streams outgoing from the output logical ports of said pool; the switching means being also adapted to consider an output logical port of the pool as vacant for a particular incoming data stream, if the outgoing data stream associated with said output logical port has priority lower than the priority of the incoming data stream and the lowest priority in the pool.

The cross-connecting switch is preferably adapted for handling SONET/SDH or OTN data frames.

The internal switching means are preferably adapted for checking said path identifier, for example a standard path identifier being carried as a path trace identifier in one of the following overhead bytes: J1, J2, J0 or any OTN layer TTI (Trail Trace Identifier).

As has been mentioned above, the term "logical port" should preferably be understood as a combination of a physical port and a time slot for TDM systems, or as a combination of a physical port and a wavelength for WDM systems.

The internal switching means can be in the form of a switching fabric or matrix (hardware), or in the form of a database or an internal table (software) in the memory (hardware), and/or other software/hardware means.

For example, the internal switching means can be built in the form of an internal table provided with an additional column comprising one or more specific values of the path identifiers associated with at least some of the input logical ports and output logical ports (so-called shared logical ports).

For situations when more than one of said incoming data streams require rerouting, or situations where rerouting to a particular output logical port is undesired (for example, it is presently caught by an important data stream), priorities are preferably assigned to at least some of the data streams, having specific path identifiers, and stored in said internal switching means.

For example, said internal means can be provided with an optional priority column which is to be checked, say whenever more than one data streams claim one and the same output logical port.

Since for any protected path (or segment) there is a protecting path (or segment) pre-provisioned by NMS, the internal means of all cross-connecting switches in the protecting path (or segment) are pre-provisioned by NMS or any other central or distributed planning and/or management platform to be diversely routed in respect of the protected path (or segment). Therefore, all the mentioned assignments in the switch are performed in advance; in other words, all shared input and output ports and the set of potential cross-connects that may utilize them should be pre-provisioned. On the other hand, the switching means must be re-configurable to allow flexibility of routing in the network.

It should be noted that the internal switching means are required to perform monitoring of the path identifiers and the priorities only for the shared input/output logical ports, i.e. for the input logical ports intended for possibly receiving data streams to be rerouted, and for output logical ports intended for possible resolution of contention of two or more incoming data streams and for selecting the outgoing data stream(s).

Additionally, the internal switching means is usually provided with a parameter acquiring fault indication signals or loss of signal when received from any downstream node. The internal switching means is capable of rerouting a data stream to a protection path if such signals/indications are received in respect of that data stream or a link supporting the data stream.

BRIEF DESCRIPTION OF THE DRAWINGS

The present invention will be further described and illustrated with reference to the following non-limiting drawings, in which:

FIG. 2 illustrates one simplified exemplary version of an internal switching means of the cross-connecting node according to the invention.

FIG. 3 illustrates another example of assigning the internal switching means.

DETAILED DESCRIPTION OF THE PREFERRED EMBODIMENTS

Figure 1:
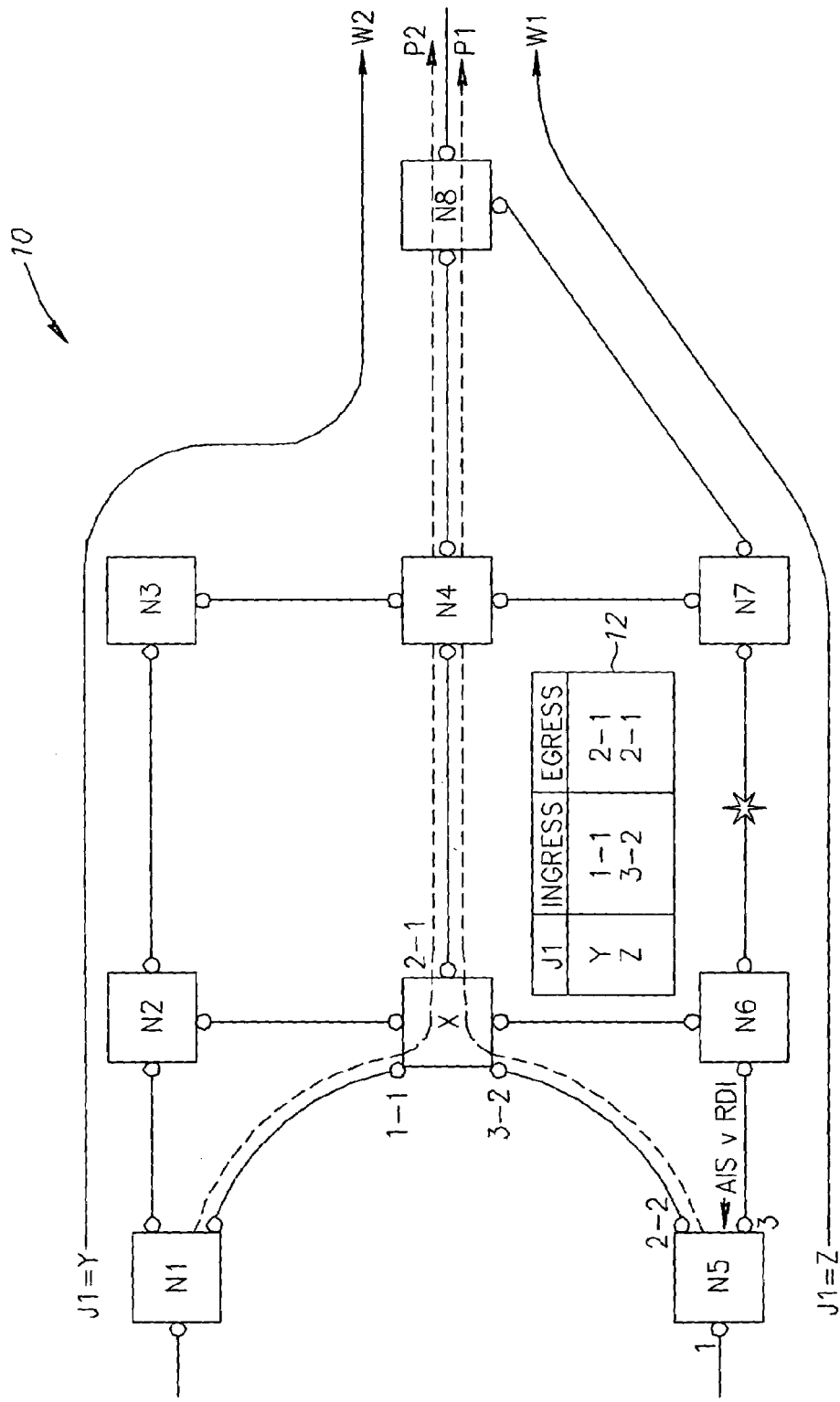
FIG. 1 illustrates a schematic block diagram of a mesh network comprising cross-connecting nodes, for performing fast reconfiguring of data paths.

FIG. 1 illustrates one fragment of a SONET/SDH (for example) mesh network 10, composed from cross-connecting nodes N1-N8 and a cross-connecting node X which will be considered in detail. Two data streams starting from the node N1 and node N5 respectively have working paths W1 and W2 (shown by solid lines) which do not originally pass via a cross-connecting switch X. The cross-connecting switch X is part of the mesh network (like any other node) and serves for altering connections in the mesh, in particular—for changing paths or segments of paths of data streams in case of detecting faults in the working paths of the data streams, or appearing other reasons for rerouting. For example, in case of a fault in the working path W1 (marked with an asterisk between nodes N6 and N7), the source node N5 receives defect indications from the neighboring node N6. The defect indications can be such as a forward defect indication signal, a backward defect indication signal, or a loss of signal. In SONET/SDH networks these defect indications are called AIS, RDI, and LOS respectively. If the fault occurs at a remote link, the indications may be generated not only by node N6, but also by node N8 (for a bi-directional path). In this case, the source node N5, also being a cross-connecting switch, stops sending the data stream to node N6 via its output port 3, and redirects it to a pre-provisioned protection path, namely via its output port 2, time slot 2 (logical output port 2-2) to the cross-connecting switch X through its input port 3 at time slot 2 (logical input port 3-2). According to the invention, to be let to a protection path via the cross-connecting switch X, the data stream must carry preliminarily known path identifier (source indication). Let in this case this path trace identifier has a value Z and is cast in byte J1 at the source node. Though re-directed, the data stream continues carrying its unique path identifier so that and it could be recognized at the intended destination node, which does not change. In this example, the cross-connecting switch X comprises an internal table (a fragment thereof is schematically shown in a table 12) which, in case of receiving a data stream indicated with a predetermined path identifier Z at a predetermined input port & time slot (say, 3-2), ensures connecting that data stream to an output port & data slot (say, 2-1) which serves a shared port of a protection path P1 (marked with a lower dotted line). For example, the output port (2-1) may also serve a data stream incoming to an input port (1-1) with a predetermined value Y of the path trace indication (protection path P2, the upper dotted line). It should be noted that the mentioned output port may normally serve other traffic (so-called preemptive traffic), but must become available if the protection is required. The same applies to the mentioned input ports 3-2 and 1-1. The described functions of node X can also be embedded at least in the nodes N4, N8 that form part of the protective paths P1, P2 shown in the drawing. The matters of priority can be regulated in the internal table of the switch, for example in a manner shown in FIG. 2.

FIG. 2 illustrates a portion of an exemplary internal switching means of the cross-connecting node, in the form of a switching table. In this drawing, logical ports are indicated with small letters, the path identifiers are marked with capital letters. The example illustrates the case where, for reconfiguring a particular path within the node, one specific logical output or egress port is pre-provisioned (the pool of output logical ports comprises a single output logical port).

In the drawing, one can see that the switching means ensures connection between an input (ingress) logical port symbolically named "a" to an egress (output) logical port "k" in case the path identifier of the data stream arriving to the port "a" is equal to "X". No priority is stated for the data stream "X". On the other hand, the output logical port "k" usually serves the input logical port "b" for switching an incoming data stream (its path identifier is not important, and thus marked by "*"). In case the data stream indicated "X" indeed arrives to port "a", (the ports, which are supposed to receive traffic for rerouting, should perform monitoring of the path identifier of the incoming streams), the connection will be made between "a" and "k", since the preference is given to the data stream with the path identifier pre-determined in the table. The dotted column "Granted Egress logical Port" (which might actually not exist in the internal table) schematically indicates which ports can be finally chosen by the switching means if the data stream "X" indeed arrives at the input port "a". As can be seen, the data stream "X" will be output from the port "k", while the stream which arrives at the ingress port "b" will be dropped.

Lower in the table, one can see that a data stream with the path identifier "Y" may appear at an ingress logical port "d", and a data stream with the path identifier "Z" is expected at an ingress logical port "e". We consider that appearance of any of these data streams at the respective ports "d", "e" means that a protection path is required. Let, only one shared protection path exists for both of these data streams, and therefore they both are allowed to use a shared output logical port "n" connected to that protection path. However, for resolution of contentions, the data stream "Y" is assigned a higher priority than the data stream "Z". In a regular regime, the egress logical port "n" serves for transmitting a data stream of low importance from an ingress logical port "f". Depending on the reconfiguring event—which data stream (Y, Z or both) arrive to their egress logical ports—the egress logical port "n" will be granted or not granted to the mentioned three data streams. The data stream "Y", if appears, will always get the port "n", the data stream "Z" will get it only if "Y" does not contend, otherwise both "Z" and the less important data stream will be dropped.

The internal switching table may comprise other connection details. For example, the data stream incoming the ingress port "c" does not have any path identifiers to check, and any priorities to check (mark * explicitly indicates "do not care"), since it has a non-shared connection to the egress port "l".

A data stream "Q" incomes the cross-connecting node at the ingress logical port "g" and is normally output at the logical port "p". In case of receiving indications AIS or RDI (for example) with respect to stream "Q", this stream is to be switched to an egress port "m".

FIG. 3, using the schematic illustration of the internal switching table and port indications similar to those in FIG. 2, illustrates another example of reconfiguring internal connections in the cross-connecting node.

Suppose, that the data stream with the path identifier "X", if arrives to an ingress logical port "a", can be switched either to a logical egress port "k", or to "l". The column "Allowed egress logical port" shows the pool comprising two ports "k" and "l". Let in this example the data stream "X" has the priority "5". The egress logical port "k" is usually occupied by a data stream incoming via the ingress port "b" and having priority "3". The logical port "l" transmits idle traffic with the priority "0"; it can be also a preemptive traffic with the priority "0" or "1" from the ingress port "c". If the data stream "X" arrives to the switching node at the ingress port "a", it, according to the priorities, will be granted the egress logical port "l" causing the preemption of any other lower priority traffic.

The last example will illustrate how a pool of output logical ports can serve the purposes of shared protection. A data stream with the path identifier "Y" and the priority "5" is assigned a pool of egress logical ports comprising "n" and "t". The same (shared) pool of the egress ports serves another data stream "Z" with priority "4", which may arrive at the ingress logical port "e". Similarly to the previous examples, the egress logical ports "n" and "t" perform their usual task and serve lower priority data streams than those (i.e., Y,Z) which may require protection. Finally, the virtual dotted column "Granted egress logical port" illustrates how the available egress ports of the pool can be distributed if any one or both of the data streams Y, Z arrive to the respective ingress logical ports.

It will be appreciated by a person skilled in the art that the present invention is not limited by what has thus far been described with respect to specific embodiments. Rather, the present invention is limited only by the claims which follow. When used in the following claims, the terms "comprises", "comprising", "includes", "including" or the like mean "including but not limited to".

The invention claimed is:

1. In a communication circuit switched mesh network comprising two or more cross-connecting nodes, a method for rerouting a data stream comprising a plurality of data frames each associated with at least one overhead byte, wherein the rerouting comprising preliminary steps of:

pre-provisioning, for said data stream, of a working path and at least one alternative path in the network via said two or more cross-connecting nodes;

providing a predetermined path identifier for said data stream for identifying and switching the data stream at said two or more cross-connecting nodes to said one out of said at least one alternative path, said path identifier being carried by said at least one overhead byte associated with at least one of said plurality of data frames;

said rerouting being initiated by receiving at a specific cross-connecting node out of said two or more cross-connecting nodes, at least one notification of a fault occurring in the working path of said data stream;

said rerouting being performed by the following steps;

distinguishing, at said two or more cross-connecting nodes, one or more predetermined values of the path identifier at each incoming data frame, at said specific cross-connecting node, identifying said data stream using the predetermined path identifier of said data stream, and, upon receiving said at least one notification of a fault, switching the data stream to one out of said at least one alternative path pre-provisioned for said data stream via said specific cross-connecting node;

at least at one additional cross-connecting node out of said two or more cross-connecting nodes, located downstream from said specific node along one out of said at least one alternative path, switching an incoming stream to one out of said at least one alternative path pre-provisioned via said additional cross-connecting node for the data stream, in case of identifying the incoming stream as being said data stream carrying the predetermined path identifier, thereby performing the rerouting at data plane, without interaction with control/management plane.

2. The method according to claim 1, wherein said mesh network is an SDH/SONET, said path identifier is a path trace identifier associated with a source of the data stream and transmitted by one of the overhead bytes J1, J2 or J0 of a SONET/SDH standard frame.

3. The method according to claim 1, wherein said mesh network is an OTN optical network, and wherein the path identifier is transmitted by OTN TTI (Trail Trace Identifier).

4. The method according to claim 1, wherein said pre-provisioning comprises reserving, at a particular cross-connecting node, a specific logical input port for a data stream with a predetermined path identifier, and reserving one or more logical output ports for outputting said data stream from one of said one or more logical output ports.

5. The method according to claim 1, comprising providing internal switching means in said respective two or more cross-connecting nodes, the switching means being responsive to said predetermined values of the path identifier.

6. The method according to claim 1, adapted for performing a shared protection of paths or path segments of the data streams in the mesh network, the method comprising:

reserving, at a particular cross-connecting node, a first logical input port for inputting a first incoming data stream carrying a first path identifier, reserving, at the same particular cross-connecting node, a second logical input port for transmitting a second incoming data stream carrying a second path identifier, reserving, at the same particular cross-connecting node, one or more logical output ports as a shared output logical port pool for outputting there-from at least one of said first or second incoming data streams, whenever required.

7. The method according to claim 4, wherein said logical input/output port of the cross-connecting node is a combination of two parameters, wherein the first parameter is a particular physical input/output port of the node, and the second parameter is a specific time slot or a specific wavelength occupied by the data stream at the particular physical port.

8. The method according to any one of claim 6, further comprising an additional operation of applying predetermined priorities to different said data streams incoming and/or outgoing the cross-connecting node.

9. A cross-connecting switch for rerouting a data stream in a node of a communication circuit switched mesh network, supporting incoming data streams comprising a plurality of data frames each associated with at least one overhead byte, the switch comprising internal switching means for establishing internal connections there-inside, said internal switching means being adapted to pre-provision, for at least one of the incoming data streams, carrying a predetermined path identifier in said at least one overhead byte of the data frames, switching to at least one alternative path;

the switch being provided with means for distinguishing said predetermined path identifier being transmitted by the at least one overhead byte associated with the data frames of said incoming data stream, and for identifying said incoming data stream by its predetermined path identifier, and the configurable internal switching means being further configured to perform internal rerouting of one or more said incoming data streams, by utilizing said predetermined path identifier in order to select one out of said at least one alternative path for said incoming data stream identified by its predetermined path identifier;

wherein said rerouting of a data stream carrying the predetermined path identifier being initiated by receiving at a specific cross-connecting node out of two or more cross-connecting nodes including said node with said cross-connecting switch, at least one notification of a fault occurring in a working path of said data stream, and wherein, while distinguishing, at said two or more cross-connecting nodes, one or more predetermined values of the path identifier at each incoming data frame, said rerouting of the data stream being performed at said two or more cross-connecting nodes by the following steps:

at said specific cross-connecting node, identifying an incoming data stream as said data stream using the predetermined path identifier of said data stream, and, upon receiving said at least one notification of a fault, performing internal rerouting of the data stream to one out of said at least one alternative path pre-provisioned for said data stream via said specific cross-connecting node;

at least at one additional cross-connecting node out of said two or more cross-connecting nodes, located downstream from said specific node along one out of said at least one alternative path, performing internal rerouting of an incoming stream of the additional cross-connecting node to one out of said at least one alternative path pre-provisioned via said additional cross-connecting node for the data stream, in case of identifying the incoming stream as being said data stream carrying the predetermined path identifier, so that the switch thereby does not require interaction with control/management plane for the internal rerouting.

10. The cross-connecting switch according to claim 9, having a first plurality of input logical ports and a second plurality of output logical ports, the cross-connecting switch being capable of rerouting a particular incoming said data stream carrying said path identifier and arriving at a specific input logical port, to one logical output port selected from a pool including one or more said output logical ports.

11. The switch according to claim 10, having a first plurality of input logical ports and a second plurality of output logical ports, and capable of rerouting at least two said incoming data streams respectively arriving at two or more specific input logical ports of said switch, to one shared pool of output logical ports, wherein said pool includes one or more said output logical ports.

12. A cross-connecting switch according to claim 11, comprising internal switching means for establishing dynamic internal connections there-inside, said means being operative to:

assign said pool of output logical ports to one or more said incoming data streams, identify each of said one or more incoming data streams based on the path identifiers transmitted by the overhead bytes of said data frames, switch the one or more said incoming data streams to respective vacant output logical ports of said pool.

13. The cross-connecting switch according to claim 12, wherein said switching means allows assigning priorities to different incoming and/or outgoing data streams.

14. The cross-connecting switch according to claim 13, wherein, in case there are no vacant output logical ports in said pool, the switching means ensures preempting one or more lower priority traffic streams using said pool.

15. The cross-connecting switch according to claim 10, wherein said logical port is either a combination of a physical port and a time slot occupied by said data stream, or a combination of a physical port and a wavelength occupied by said data stream.

16. The cross-connecting switch according to claim 9, adapted for handling SONET/SDH or OTN data frames and for checking said path identifier being carried as a path trace identifier in one of the following overhead bytes: J1, J2, J0, or at OTN layer Trail Trace Identifier TTI.

17. The cross-connecting switch according to claim 10, adapted for monitoring said path identifiers at least at the input logical ports intended for possibly receiving data streams to be rerouted.

18. The cross-connecting switch according to claim 12, designed to allow pre-configuring and re-configuring of said internal switching means for pre-provisioning of working and alternative paths and/or segments of paths of the data streams.

19. The cross-connecting switch according to claim 9, capable of rerouting the data stream to a protection path if indications of fault or loss of signal are received in respect of that data stream or a link supporting the data stream.

* * * * *